UNITED STATES PATENT OFFICE.

RUFUS N. CHAMBERLAIN, OF CHICAGO, ILLINOIS, ASSIGNOR TO GOULD STORAGE BATTERY COMPANY, A CORPORATION OF NEW YORK.

STORAGE-BATTERY PLATE AND PROCESS OF MAKING SAME.

1,379,900. Specification of Letters Patent. Patented May 31, 1921.

No Drawing. Continuation of application Serial No. 214,663, filed January 31, 1918. This application filed September 12, 1918. Serial No. 253,806.

*To all whom it may concern:*

Be it known that I, RUFUS N. CHAMBERLAIN, a citizen of the United States, and a resident of the city of Chicago, county of Cook, State of Illinois, have invented certain new and useful Improvements in Storage-Battery Plates and Processes of Making Same, of which the following is a specification.

My invention relates to storage batteries and one of the objects of my invention is to increase the capacity of a plate of given dimensions while at the same time materially decrease the weight thereof. Considerable investigation has been made heretofore in an endeavor to increase the surface of active material which comes in contact with electrolyte in storage battery plates of the pasted type with a view to increasing the efficiency of the battery.

It is well known that there is a considerable amount of active material in the plates of ordinary construction which is not effective probably because the electrolyte does not have sufficient access to the interior thereof. Practically speaking, this extra weight of active material, which might be called inert or inactive, not only adds nothing to the capacity of the plate, but for a given capacity makes a considerable amount of undesirable weight.

Due to the rapid development of automobiles and submarines it has become of great importance to decrease the weight of storage batteries as well as to increase the capacity thereof per unit of weight.

By my present invention I solve this problem and produce a plate having the desired qualities. This plate is produced by mixing finely divided porous material with the active material or material to become active. I have found the following method of manufacture of such plates commercial but it is understood that my invention is not limited to this precise method of manufacture.

The lead oxid, active material or material to become active, is mixed with finely divided wood particles or similar absorbent material, the proportion of wood particles, if that material is used, being about one part by volume to four parts of oxid or active material by volume. The wood particles or equivalent acid absorbent is preferably mixed while dry with the other dry ingredients from which the paste is made. The dry mixture is then preferably made into a suitable paste and applied to the grid in a well known way. When wood particles are used, I prefer to use a wood which has little or no organic acid forming material therein, such as for instance California red wood or cypress. I have found these two woods to be satisfactory although other woods may be used. In any event the wood or other particles should preferably be used in a highly divided state. I prefer to use particles none of which is so large that it will not pass through a screen of 30 mesh. The preferred range in size is 25 to 40 mesh but variations may be made and beneficial results obtained, but I have found that the best results are obtained with particles not larger than 25 mesh. When wood particles are used the particles vary considerably in size, but this variation is not harmful even if some are larger than above indicated unless the percentage of those large particles is too large.

When ordinary active material is pasted into grids and formed, it usually has a dense and somewhat non-porous texture when new, but after being in service, its porosity increases to a greater or less degree. The absorbent material being intimately mixed throughout the paste, and by reason of its absorbent properties acts to aid the requirements of the active material during discharge by increasing its capacity. Later when the active material becomes softer and more porous and more absorbent, due to service conditions, the absorbent material by that time may have partially lost its texture and body and given way to the more expanded and porous active material. I have found that the absorbent material aids the active material in its acid qualities when this is most needed, that is when the plate is new, and this aiding in the acid qualities decreases when the necessity therefor has partially or substantially disappeared, that is after the plate has been in service for a period of time. I have found that if the particles used are large the active material of the plate will be weakened mechanically and in that way the life of the plate will be shortened. One advantage therefore of the finely divided particles is that the plate is strong mechanically. Another is that of increased capacity per unit weight.

By the use of small particles as above described, many advantages are secured over plates in which fibers or pulp or other material of stringy nature have been incorporated. It also has many advantages over a plate in which any material, which, when wet, forms lumps or is non-uniform. The advantages secured, as above indicated, consist of a strong mechanical structure, a uniform active material, long life and a uniform increase of capacity throughout the whole of the active material of the plate.

I do not know exactly what takes place, nor exactly how the benefits derived are secured but offer by way of suggestion the following possible explanation, to wit:—

The absorbent material makes it possible for little pockets of acid to be uniformly distributed throughout the body of the active material whereby a large part of the active material in the plate may be used effectively and efficiently, as distinguished from the mere surface contact as used heretofore. As the plate continues in service the absorbent material probably deteriorates and allows the active material through expansion to become more porous and absorbent itself, this porosity coming from service conditions and the same being permitted by the presence of these specks of deteriorated absorbent material, which are also elastic.

I desire not to be limited in any respect to the explanation above outlined, but offer the same merely as my opinion.

Resulting from the invention above disclosed the capacity of the plates is increased from twenty to thirty per cent. over the ordinary pasted plates, and the weight of the active material of this plate of twenty per cent. increased capacity is fifteen to thirty per cent. less than the active material of the regular pasted plate of the same dimensions.

While I have given above, as an example, the proportions of absorbent material to be used and the preferred size and range of size of the particles used, I wish it to be understood that these proportions and sizes may be varied depending upon the desired capacity and life of the resulting plate.

This is a continuation of my application S. N. 214,663 filed January 31, 1918.

I claim:

1. A storage battery plate comprising a grid with active material pasted thereon, said active material having uniformly distributed therein particles of wood containing relatively little organic acid, the particles of wood being mostly of a size that just pass through screens of from 25 to 40 mesh to the inch and the quantity of wood particles present in the active material being about 1 part wood to 4 parts by volume of active material when dry.

2. The method of making a storage battery plate which consists in mixing about 1 part of wood particles containing relatively little organic acid, with about 4 parts by weight of active battery material, the wood particles being of a size to pass through a screen of about 30 mesh, making a paste of the mixture and pasting the same on to a battery grid.

3. A storage battery plate comprising a grid with active material pasted thereon, said active material having uniformly distributed therein particles of wood containing relatively little organic acid, the particles of wood being mostly of a size that will pass through a screen of about 30 mesh.

In testimony whereof, I have signed my name to this specification.

RUFUS N. CHAMBERLAIN.